April 10, 1956     G. R. LITCHFIELD     2,741,246

GAS MASKS

Filed Dec. 17, 1954

Inventor

George R. Litchfield

By George Renehan

Attorney ration of Eugene Sovinsky, Serial No. 231,887, or a felted
United States Patent Office 2,741,246
Patented Apr. 10, 1956

2,741,246
GAS MASKS

George R. Litchfield, Edgewood, Md., assignor to the United States of America as represented by the Secretary of the Army Application December 17, 1954, Serial No. 476,095

3 Claims. (Cl. 128—141)

(Granted under Title 35, U. S. Code (1952), sec. 266)

The invention described herein may be manufactured and used by or for the Government of the United States of America for governmental purposes without the payment to me of any royalty thereon.

This invention relates to a gas mask providing for heat exchange between the incoming air and that inside the mask.

An object of this invention is to provide a gas mask having heat exchange means to condense moisture inside the mask.

A further object of my invention is to provide a gas mask suitable for use in very cold climates.

Figure 1:
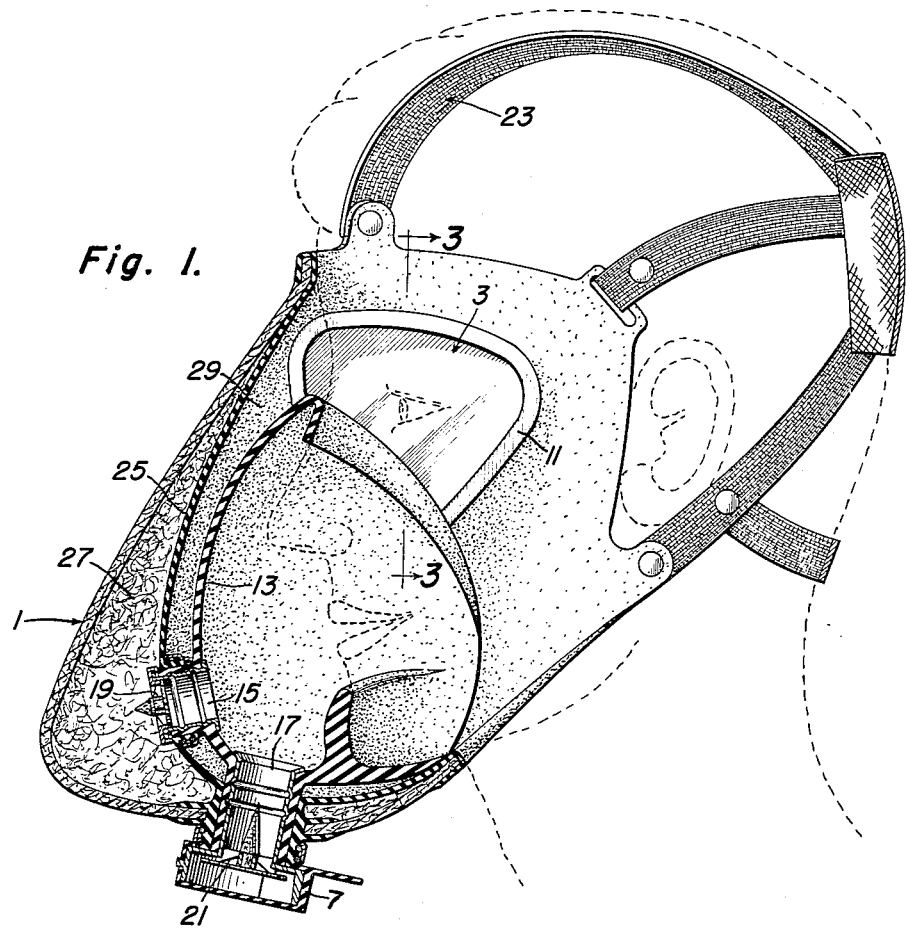
Fig. 1 is a vertical section through my mask.
Figure 3:
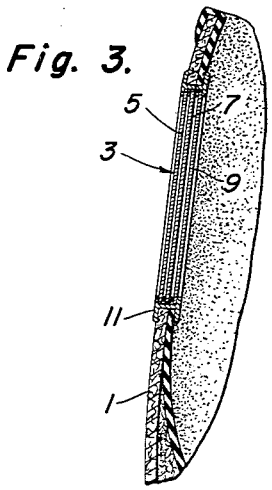
Fig. 3 is a section through an eyepiece taken on line 3—3, Fig. 1.
Figure 2:
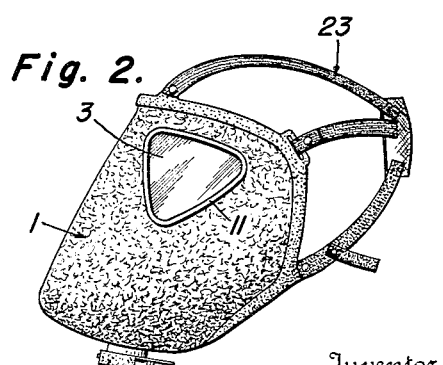
Fig. 2 is an exterior view of my mask.

The tendency of fog or frost to collect on the eyepieces of gas masks is well known and various expedients have been adapted to overcome this defect. For example, in many masks the incoming air is passed over the inner surfaces of the eyepieces. In certain types of masks, however, this is not practical. A particular problem exists in the relatively recently developed masks in which substantially the entire facepiece is formed of a filter pad.

By providing for heat exchange between the inhaled air, and that within the mask, I produce controlled condensation of moisture within the facepiece and prevent condensation on the lenses.

Referring to the drawings, my mask includes a facepiece 1 which is formed of a filter pad which is, say, ¼ in. thick and formed of fibrous material impregnated with activated carbon. This may, for example, be a plurality of sheets of filter paper impregnated with 25–30% by weight of activated carbon, as disclosed in the application of Eugene Sovinsky, Serial No. 231,887, or a felted pad of organic fibers and glass fibers impregnated with about 30% activated carbon and stabilized by about 5% of a thermoplastic resin, such as resin. The filter pad, as such, is not part of this invention. The edges of the facepiece are sealed, e. g. by being dipped in latex.

Mounted in the facepiece are eyepieces 3 having lenses formed of a plurality of layers of glass or transparent plastic 5, 7, 9, separated by sealed air spaces filled with dehydrated air. Each lens is mounted in an eye ring 11. The facepiece also includes a nosecup 13, formed of flexible resilient rubber, which seals the mouth and nose from the interior of the pad. Mounted in the nosecup are inlet tube 15 and outlet tube 17 which are provided with oneway inlet valve 19 and outlet valve 21, respectively. A head harness 23 secures the facepiece assembly to the head of the wearer.

Between the facepiece filter pad 1 and the nosecup 13, I provide a heat exchange sheet 25 of thin air tight material, e. g. butyl rubber impregnated cloth. This heat exchange sheet is secured to the eye rings 11 and the inlet tube 15. It is also secured at its edges to facepiece filter pad 1 but over most of its area it is spaced both from filter pad 1 and nosecup 13. The various parts are so shaped as to form an outer air chamber 27 and an inner air chamber 29, both of substantial volume.

In use, the heat from the face warms the air inside inner space 29 while cold air from the outside fills outer space 27. The sheet 25 is a much better conductor of heat than the multiple lenses of eyepieces 3. Hence, any moisture evaporated from the skin or eyes will condense on sheet 25 rather than on lens 9. Under the very cold conditions for which the mask is particularly designed, frost will form on the inside of sheet 25. Due to the provision of nosecup 13, the exhaled air never reaches the eyepieces, so that only evaporated moisture needs to be removed.

While I have described my mask in considerable detail, it will be obvious that various changes are possible. I therefore wish my invention to be limited only by the scope of the appended claims.

I claim:

1. In a gas mask, a facepiece covering substantially the entire face of a wearer, air purifying means associated with said facepiece and constructed and arranged to purify all air drawn into said facepiece, at least one eyepiece in said facepiece, each said eyepiece including a plurality of layers of transparent material separated by air spaces, a nosecup within said facepiece covering the nose and mouth of the wearer, at least one inlet valve in said nosecup communicating with the interior of said facepiece, at least one outlet valve communicating with the interior of said nosecup and the exterior of said facepiece, and heat exchange means within said facepiece constructed and arranged to cause the air drawn in through said filter to pass in indirect heat exchange relationship with the air which is inside said facepiece and in contact with said eyepiece.

2. A gas mask as defined in claim 1, in which said heat exchange means comprises a sheet of flexible material dividing the interior of said facepiece, outside said nosecup, into an inner chamber and an outer chamber, said outer chamber being in communication with said filter and said inlet valve and said inner chamber being in communication with the inner surface of each said eyepiece.

3. In a gas mask a facepiece comprising a sheet of filter material covering a substantial portion of the face of the wearer and spaced from the face of the wearer so as to form a chamber of substantial size, a nosecup within said chamber covering the mouth and nose of the wearer, at least one outlet valve communicating with said nosecup and the outside of the mask, a sheet of flexible material within said facepiece joined at its edges to said facepiece and dividing the interior of said facepiece into an inner chamber and an outer chamber, both of substantial size, said sheet of filter material forming a wall of said outer chamber, an inlet valve forming a communication between the interior of said nosecup and said outer chamber, at least one eyepiece mounted in said facepiece, each said eyepiece comprising a plurality of sheets of transparent material separated by air spaces, each said eyepiece forming a part of the wall of said inner chamber.

No references cited.